(12) United States Patent
Satran

(10) Patent No.: US 6,902,354 B2
(45) Date of Patent: Jun. 7, 2005

(54) CUTTING INSERT

(75) Inventor: Amir Satran, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 192 days.

(21) Appl. No.: 10/237,610

(22) Filed: Sep. 10, 2002

(65) Prior Publication Data
US 2003/0047047 A1 Mar. 13, 2003

(30) Foreign Application Priority Data

Sep. 10, 2001 (IL) .................................................. 145342

(51) Int. Cl.$^7$ ............................ B26D 1/00; B23B 27/16
(52) U.S. Cl. ...................................... 407/116; 407/114
(58) Field of Search ................................ 407/113, 114, 407/115, 116

(56) References Cited

U.S. PATENT DOCUMENTS

| 1,361,851 A | * | 12/1920 | Hall ............................. 407/92 |
| 1,449,513 A | * | 3/1923 | Jaeger ......................... 407/113 |
| 2,690,610 A | | 10/1954 | Begle et al. |
| 2,959,842 A | * | 11/1960 | Meyers ........................ 407/76 |
| 3,060,554 A | | 10/1962 | Kirchner |
| 3,188,717 A | | 6/1965 | Heinlein |
| 3,421,196 A | | 1/1969 | Reich |
| 3,490,117 A | * | 1/1970 | Hertel ......................... 407/104 |
| 3,694,876 A | | 10/1972 | Erkfritz |
| 3,701,187 A | | 10/1972 | Erklfritz |
| 3,762,005 A | * | 10/1973 | Erkfritz ....................... 407/113 |
| 3,955,259 A | | 5/1976 | Gustafsson |
| 4,230,427 A | * | 10/1980 | Belttari et al. ................ 407/91 |
| 4,529,339 A | | 7/1985 | Shimomura et al. |
| 6,167,958 B1 | * | 1/2001 | Lynde ......................... 166/55.6 |
| 6,227,772 B1 | * | 5/2001 | Heinloth et al. ............ 407/113 |
| 2004/0013478 A1 | * | 1/2004 | Dehn et al. ................. 407/113 |

FOREIGN PATENT DOCUMENTS

| DE | 147041 | 7/1921 | |
| DE | 2522735 | 12/1975 | |
| FR | 2105282 | 9/1971 | |
| FR | 2243755 | 5/1975 | |
| GB | 1084975 | 9/1967 | |
| GB | 1417434 | 12/1975 | |
| JP | 62039106 A | * 2/1987 | ............. B23C/5/20 |
| JP | 10086014 | 4/1998 | |
| JP | 10309617 | 11/1998 | |

* cited by examiner

Primary Examiner—Derris H. Banks
Assistant Examiner—Dana Ross
(74) Attorney, Agent, or Firm—Womble Carlyle

(57) ABSTRACT

A cutting insert having two end portions and an intermediate portion extending longitudinally between the two end portions. The intermediate portion has N side surfaces and N primary cutting edges. The N primary cutting edges are formed at the intersection of adjacent side surfaces. Each one of the N primary cutting edges extends from one end portion to the other end portion. At least N secondary cutting edges formed on at least one of the two end portions. A cutting corner is formed between a primary cutting edge and a secondary cutting edge. Each secondary cutting edge extending away from the cutting corner in a direction generally away from the intermediate portion.

19 Claims, 6 Drawing Sheets

CUTTING INSERT

FIELD OF THE INVENTION

This invention relates to indexable cutting inserts which are particularly well suited for use in milling tools and have an elongated form with a generally polygonal cross section and cutting edges extending generally longitudinally from one end of the cutting insert to the other.

BACKGROUND OF THE INVENTION

Cutting inserts or tools having an elongated form with a generally polygonal cross section and cutting edges extending generally longitudinally from one end of the cutting insert to the other are disclosed in U.S. Pat. Nos. 147,041; 3,188,717 and 3,421,196. A turning and planing tool is described in the '041 patent. At each corner of its cross section the tool has a cutting edge which runs along the length of the tool. The cross section is obtained by arranging the clearance angle and the cutting angle in such a way that they succeed each other all around the cross section of the tool. The '196 patent describes a disposable cutting insert in the form of a generally rectangular block having at least four parallel cutting edges. At least one of the cutting edges is chamfered to form a relatively blunt cutting edge. The chamfered cutting edge is less subject to shock damage than the unchamfered edges. During a cutting operation the insert can be indexed to present the chamfered cutting edge when stock is to be removed from a workpiece portion having an irregular surface.

U.S. Pat. No. 3,188,717 discloses a cutting bit which is basically a parallelepiped having front and rear generally square faces and four rectangular or square side faces disposed normal to each other and forming cutting edges at their respective intersections. Each of the side faces bounded by a pair of cutting edges is provided with a pair of longitudinally extending depressed chip guides. FIGS. 6 and 7 of the '717 patent show a portion of a milling cutter carrying a plurality of such cutting bits. However, the cutting bits do not possess secondary cutting edges, termed wipers, for achieving a smoothly finished surface in a single pass.

U.S. Pat. No. 3,955,259 discloses an indexable cutting insert for a milling cutter having four main cutting edges and four associated secondary cutting edges. The purpose of a secondary cutting edge is to make a finishing cut. The cutting insert has the form of a polygonal flat plate and each main cutting edge meets its associated secondary cutting edge at one end thereof at a cutting tip (or cutting corner). All in all there are four cutting tips.

It would be advantageous, from the point of view of the strength of the cutting insert, if the cutting insert of the '259 patent were to be designed to have a substantially square cross section, instead of a rectangular (flat plate) cross section. It would be further advantageous, if each main cutting edge would have an associated secondary cutting edge at each end thereof, giving rise to eight cutting tips. When performing milling operations which utilize approximately half the length of a main cutting edge, such a cutting insert with eight cutting tips would have eight effective main cutting edges. However, associated with each secondary cutting edge, of the cutting insert of the '259 patent, is a pair of bevel faces, and at a given end portion of the cutting insert one pair of bevel faces, associated with one corner, is separated from the other pair of bevel faces, associated with the other corner of that end portion, by a flat surface which extends across the cutting insert between the top and bottom surfaces. This particular structure of the end portions of the cutting insert of the '259 patent does not facilitate the extension of the cutting geometry to eight cutting tips.

It is an object of the present invention to provide a cutting insert that has a substantially square cross section with four rectangular or square side faces, forming main cutting edges at their respective intersections, wherein each main cutting edge is provided with a secondary cutting edge (wiper) for making a finishing cut, at each end thereof, giving rise to eight cutting corners.

SUMMARY OF THE INVENTION

In accordance with the present invention there is provided a cutting insert comprising:

two end portions and an intermediate portion extending longitudinally therebetween, the cutting insert having an insert axis A which traverses the cutting insert in a longitudinal direction between the two end portions;

an integer number N side surfaces and N primary cutting edges, the N primary cutting edges being formed at the intersection of adjacent side surfaces, each one of the N primary cutting edges extending between the two end portions;

at least N secondary cutting edges formed on at least one of the two end portions, the at least one of the two end portions extending generally longitudinally from the intermediate portion;

at least N cutting corners, each cutting corner being formed between a primary cutting edge and a secondary cutting edge, each secondary cutting edge extending away from an associated cutting corner in a direction generally away from the intermediate portion.

Preferably, each primary cutting edge is provided with a chip control element.

In accordance with one specific application, the chip control element is a groove.

If desired, the groove has a U-shaped profile.

Further if desired, the groove has a non-symmetric V-shape profile.

In accordance with the present invention, at least one end portion comprises a peripheral end surface extending from the N side surfaces to an end face.

If desired, the end face is provided with a recess.

Typically, the peripheral end surface extends from the N side surfaces away from the intermediate portion generally longitudinally and towards the insert axis A.

Preferably, the peripheral end surface comprises N sub-peripheral end surfaces.

If desired, each sub-peripheral end surface is divided into two portions, a leading portion and a trailing portion.

In accordance with the present invention, the leading portion of a sub-peripheral end surface and an adjacent chip control element meet at a secondary cutting edge.

If desired, at least one of the N cutting corners is chamfered.

Further if desired, at least one of the N secondary cutting edges is curved.

In accordance with a specific embodiment of the present invention, the cutting insert has N-fold rotational symmetry about the insert axis A.

In accordance with the present invention N is at least four.

In accordance with a preferred embodiment of the present invention, N is equal to 4.

In accordance with a specific application, the primary cutting edges are substantially straight and are substantially parallel to the insert axis A.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
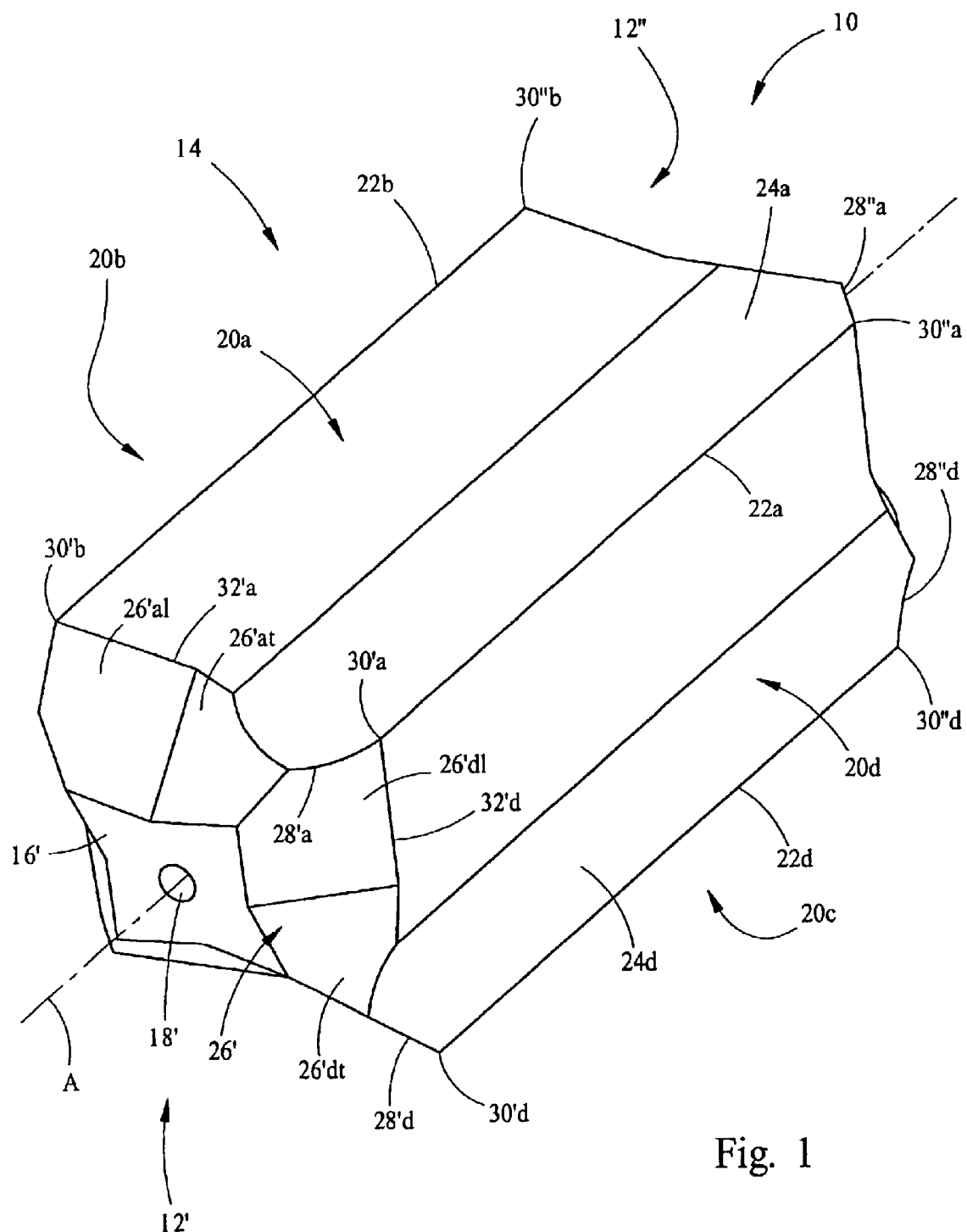
FIG. 1 is a perspective view of a cutting insert in accordance with a preferred embodiment of the present invention.
Figure 2:
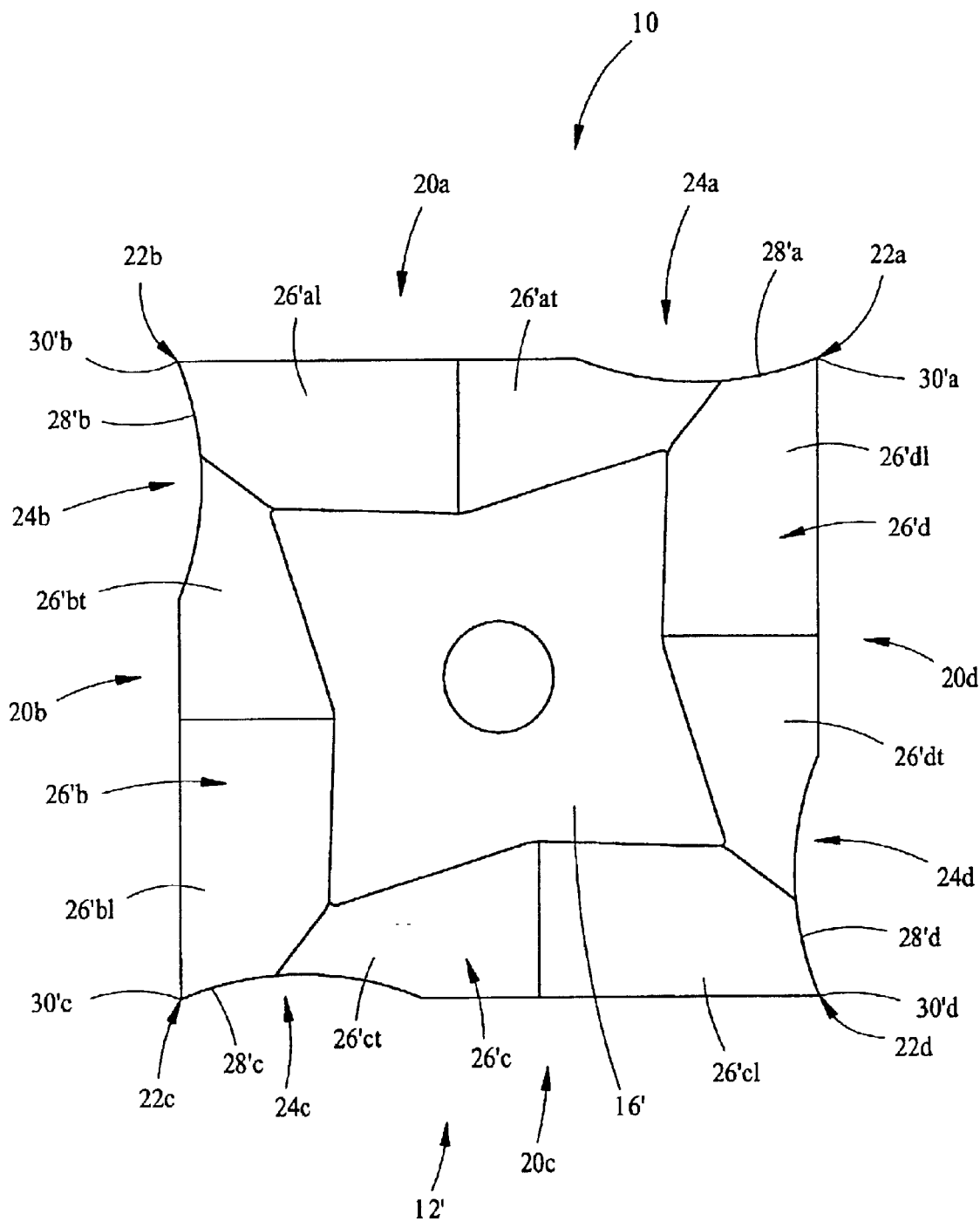
FIG. 2 is an end view of the cutting insert shown in FIG. 1.
Figure 3:
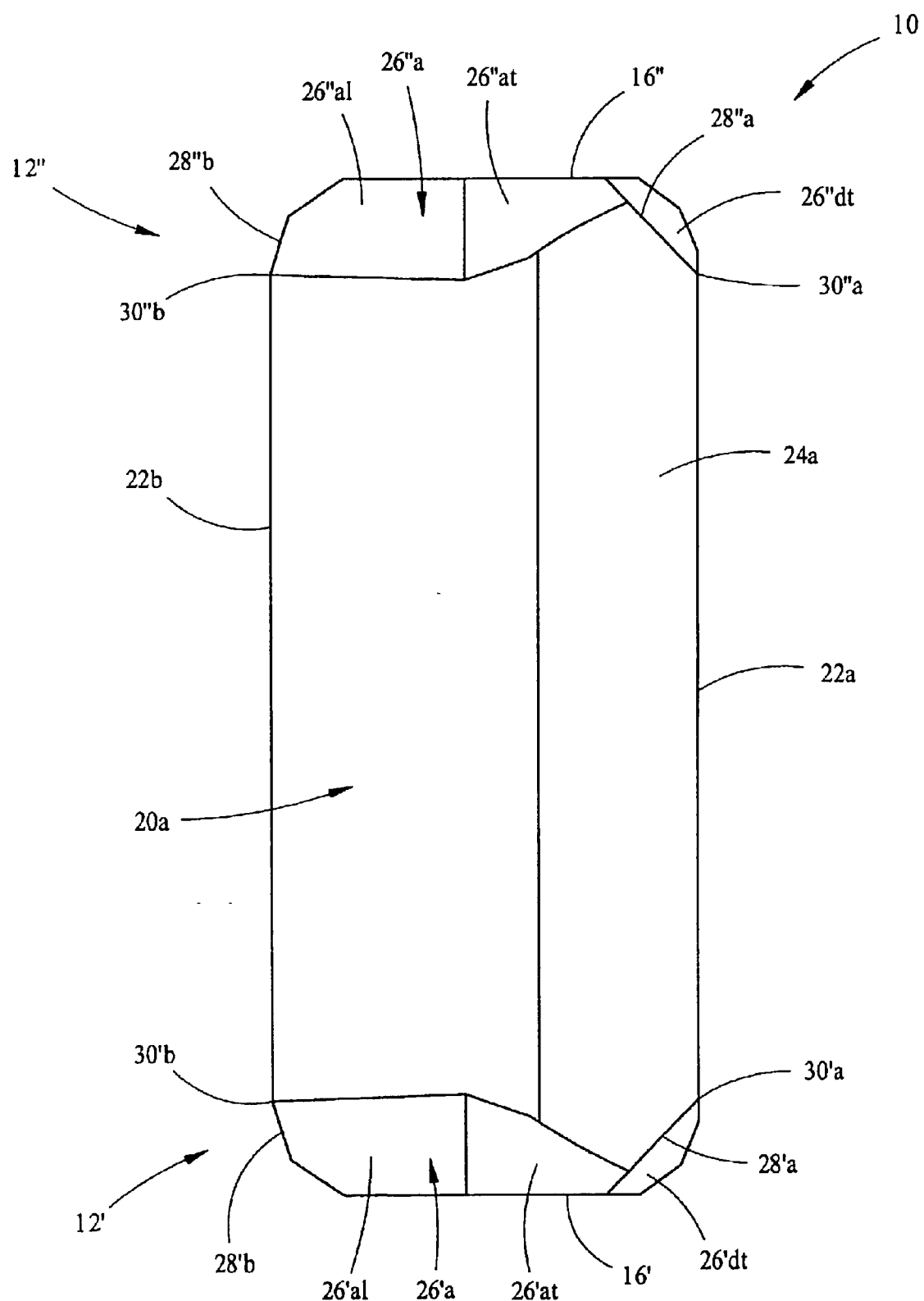
FIG. 3 is a top view of the cutting insert shown in FIG. 1.

Attention is drawn to FIGS. 1 to 3 showing, respectively, perspective, end and top views of a cutting insert 10 in accordance with a preferred embodiment of the present invention. The cutting insert 10 has two end portions 12, a first end portion 12' and a second end portion 12". In the following, a reference numeral with a prime will denote members relating to the first end portion 12' and a reference numeral with a double prime will denote members relating to the second end portion 12". Extending between the two end portions is an intermediate portion 14. An insert axis A traverses the cutting insert 10 in a longitudinal direction from one end portion to the other end portion. Hence, the end portions extend generally longitudinally from the intermediate portion and define axially outermost portions of the cutting insert. Each end portion 12 (12', 12") has an end face 16 (16', 16"). An end face of an end portion defines an axially outermost surface of that end portion. If desired, each end face 16', 16" is provided with a recess 18', 18" centered on the insert axis A. If desired, the recess 18', 18" can be used for receiving a protrusion for aiding in the clamping of the insert. It should be noted that where no confusion can arise reference will be made simply to reference numerals without a prime or a double prime, i.e., to an end portion 12, an end face 16 and a recess 18, etc.

The intermediate portion 14 comprises four side surfaces 20 (20a, 20b, 20c, 20d) and four primary cutting edges 22 (22a, 22b, 22c, 22d). The four primary cutting edges 22 are formed at the intersection of adjacent side surfaces. Each one of the four primary cutting edges 22 extends from one end portion to the other end portion. Therefore, in a plane perpendicular to the insert axis A, each side surface 20 is bound by two primary cutting edges 22. Each primary cutting edge is provided with a chip control element 24 (24a, 24b, 24c, 24d), which in the embodiment shown in FIGS. 1 to 3 is a shallow U-shaped groove in each side surface extending longitudinally along the length of the primary cutting edge. As is well known in the art, the specific form of the groove depends on the material of the workpiece and on the cutting conditions.

Extending from the side surfaces 20, generally longitudinally and towards the axis A, to the end faces 16', 16" at each end portion is a peripheral end surface 26 (26', 26"). Each peripheral end surface 26', 26" comprises four sub-peripheral end surfaces 26'i; 26"i (i=a, b, c or d). Where, the sub-peripheral end surfaces belonging to the first end portion 12' are denoted by the generic reference numeral 26'i and the sub-peripheral end surfaces belonging to the second end portion 12" are denoted by the generic reference numeral 26"i. Where i=a, b, c or d. In the embodiment shown in FIGS. 1 to 3 the four sub-peripheral end surfaces of each end portion are identical. However, as will be explained below, the sub-peripheral end surfaces of a given end portion of the cutting insert do not have to be identical. Furthermore, the sub-peripheral end surfaces of the first end portion 12' can be different from the sub-peripheral end surfaces of the second end portion 12".

As seen, each sub-peripheral end surface 26'i, 26"i is divided into two portions, a leading portion 26'il (26'al, 26'bl, 26'cl, 26'dl) and a trailing portion 26"it (26"at, 26"bt, 26"ct, 26"dt). In general, a leading portion of a sub-peripheral end surface 26i will be denoted by 26il and a trailing portion of a sub-peripheral end surface 26i will be denoted by 26it. Although a line has been drawn in the figures at the junction of the leading portion and the trailing portion of each sub-peripheral end surface, the radius of curvature of the surface of the sub-peripheral end surface at the junction can be large, if desired. In fact, although the leading and trailing portions are shown as two adjoining facets, they can be two parts of one continuous curved surface. A secondary cutting edge is formed at the junction between a leading portion of a sub-peripheral end surface and an adjacent chip control element. For example, the junction between the leading portion 26'dl of the sub-peripheral end surface 26'd and the adjacent chip control element 24a defines the secondary cutting edge 28'a. Clearly, both the shape of the chip control element 24a and the slope of the leading portion 26'dl will determine the shape of the secondary cutting edge 28'a. In a similar fashion, the shapes of the other secondary cutting edges are determined.

A junction 32', 32" is formed between each leading portion of a sub-peripheral end surface and an adjacent side surface. For example, at the first end portion 12', a junction 32'a is formed between the leading portion 26'al of sub-peripheral end surface 26'a and adjacent side surface 20a. In a similar manner, junctions 32'i (i=b, c, d) are formed between the leading portions 26'il (i=b, c, d) of sub-peripheral end surface 26'i (i=b, c, d) and their respective adjacent side surfaces 20i (i=b, c, d). Similarly, at the second end portion, junctions 32"i (i=a, b, c, d) are formed.

Associated with each end portion 12', 12" are four secondary cutting edges 28' (28'a, 28'b, 28'c, 28'd); 28" (28"a, 28"b, 28"c, 28"d). Each secondary cutting edge 28', 28" is connected to an adjacent primary cutting edge 22 via a cutting corner 30. Therefore, the cutting insert 10 has eight cutting corners 30 (four cutting corners 30' (30'a, 30'b, 30'c, 30'd) are associated with the first end portion 12' and four cutting corners 30" (30"a, 30"b, 30"c, 30"d) are associated with the second end portion 12"). Each primary cutting edge 22 extends longitudinally between two cutting corners 30', 30". Clearly, each primary cutting edge 22 is connected to two secondary cutting edges 28', 28", one secondary cutting edge being connected to one end of the primary cutting edge at the end portion 12' and a second secondary cutting edge being connected to the primary cutting edge's other end at the other end portion 12". For example, primary cutting edge 22a is connected to secondary cutting edge 28'a via cutting corner 30'a at one end, and to secondary cutting edge 28"a via cutting corner 30"a at its other end.

The radius of curvature of the cutting corners 30 is dependent on the radius of curvature of the junction 32 formed between the leading portion 26il of the sub-peripheral end surface 26i and the adjacent side surface 20i (i=a, b, c, d) adjacent the corner in question. For example, the radius of curvature of the cutting corner 30'b is dependent on the radius of curvature of the junction 32'a formed between the leading portion 26'al of the sub-peripheral end surface 26'a and the adjacent side surface 20a.

In accordance with the embodiment shown in FIGS. 1 to 3, the cutting insert 10 exhibits 4-fold rotational symmetry about the insert axis A. In general, an insert can have N-fold rotational symmetry about the insert axis A, where N is an integer greater or equal to four. However, as will be described below the cutting insert does not necessarily have to exhibit rotational symmetry about the insert axis A. In general, each chip control element 24 of a given cutting insert can have a different geometrical form. Furthermore, not all the secondary cutting edges 28 necessarily have the same geometry, even if the chip control elements 24 are identical.

Figure 4:
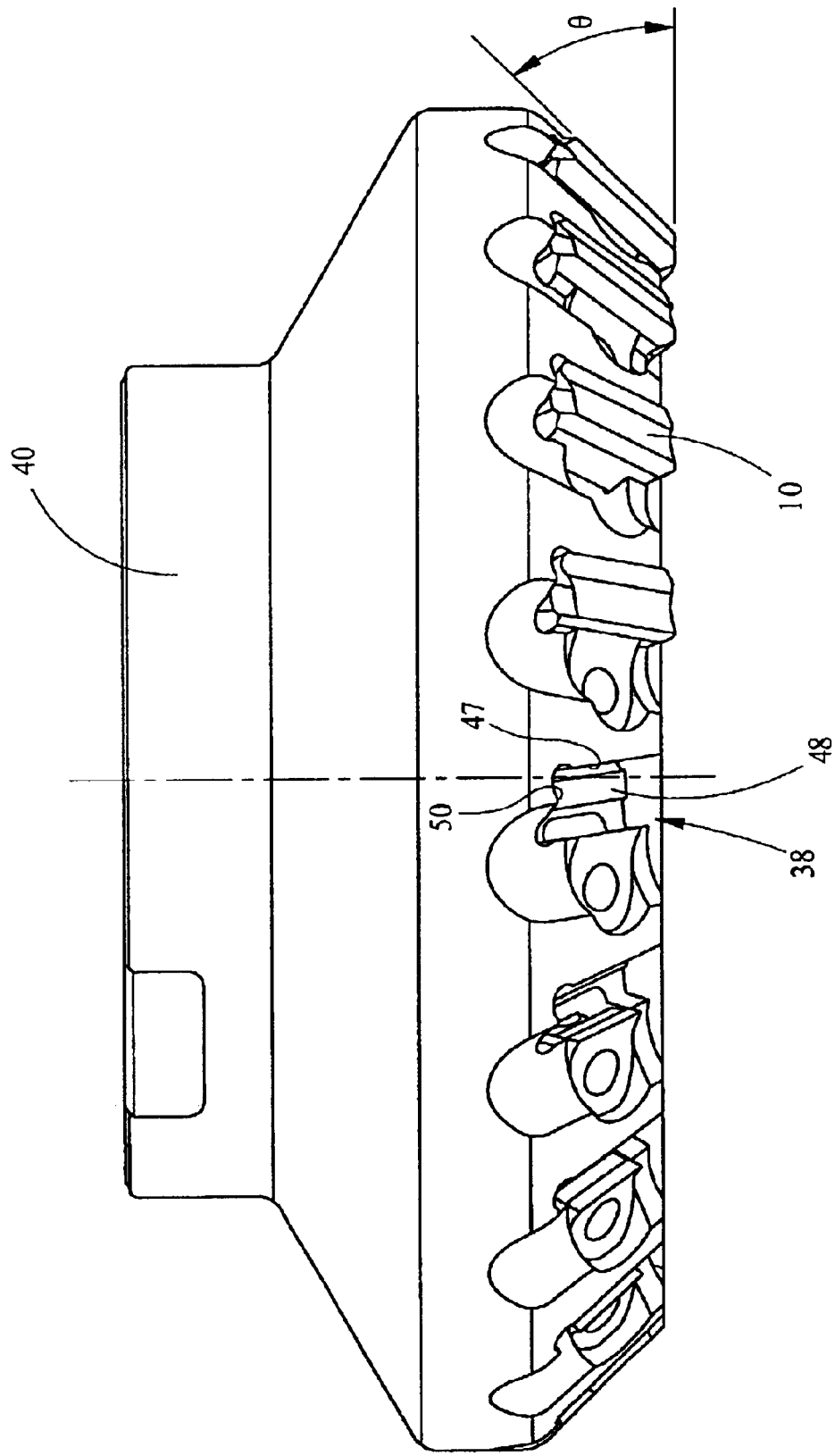
FIG. 4 is a side view of a face milling cutter showing cutting inserts in accordance with the present invention clamped in a few insert receiving pockets.
Figure 5:
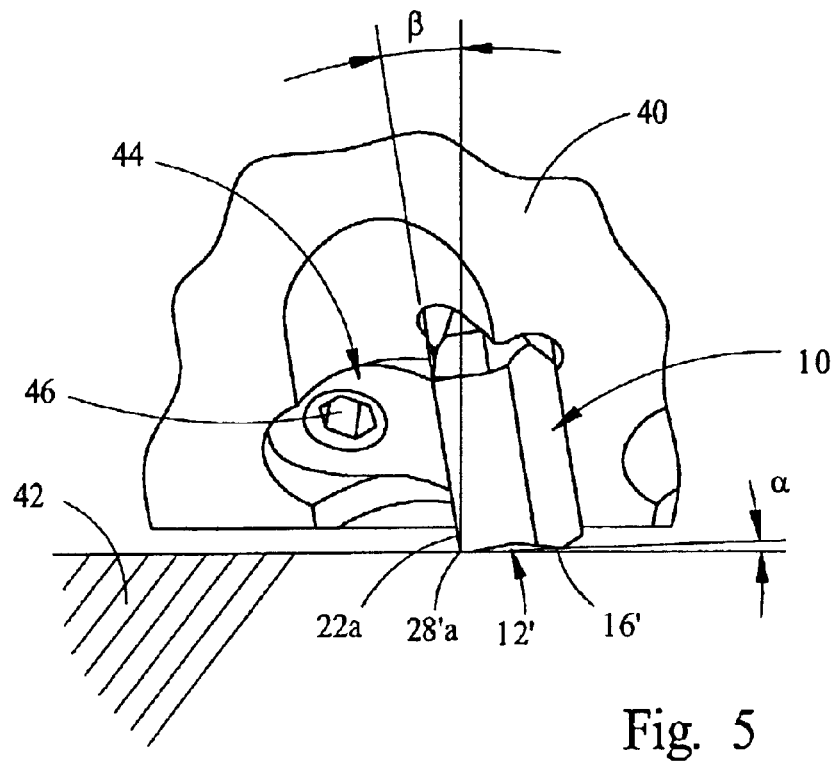
FIG. 5 is a partial view of FIG. 4 showing one insert receiving pocket with an insert clamped therein.
Figure 6:
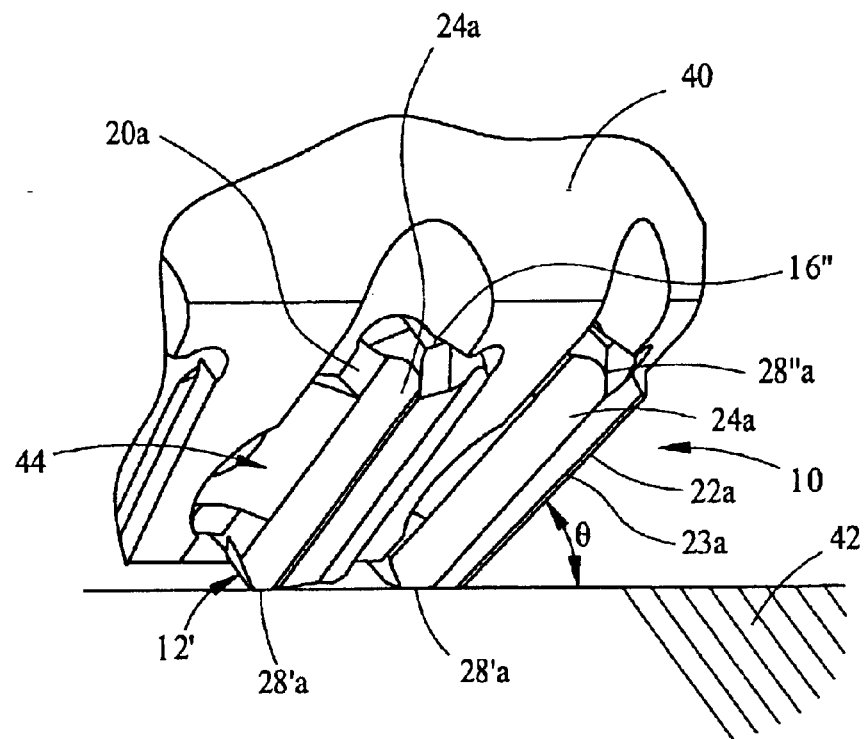
FIG. 6 is a partial view of FIG. 4 showing the disposition of secondary cutting edges relative to a workpiece.

Attention is now drawn to FIGS. 4 to 6, showing cutting inserts 10 in accordance with the present invention, clamped in insert receiving pockets 38 of a face milling cutter 40. In FIG. 6 a land 23 (23a, 23b, 23c, 23d) has been added to each primary cutting edge (only one primary cutting edge 22a and its associated land is seen in this figure). In accordance with the specific application shown in the figures the insert receiving pockets are designed so that the lead angle θ is equal to 45° relative to a workpiece 42. In the specific application shown in the figures each insert is retained in position by means of a clamp 44. The clamp is secured in the insert receiving pockets by means of a screw 46. As can be seen (see especially FIGS. 5 and 6) the orientation of the cutting inserts 10 in the insert receiving pockets 38 is such that for each insert there is one active primary cutting edge 22a and that its associated secondary cutting edge 28'a (also termed the active secondary cutting edge) at the first end portion 12' of the cutting insert acts as a wiper. Furthermore, the cutting insert has an axial rake angle β thereby providing a clearance angle of a between the first end portion 12' of the cutting insert and the workpiece 42. It should be noted that the clamp 44 abuts the side surface 20a associated with the active primary cutting edge 22a (hence, this side surface will also be referred to as the active side surface) but it preferably does not overlap the associated active chip control element (groove) 24a (also termed the active chip control element). A side wall 47 of the insert receiving pocket opposite the clamp, supports the insert side surface 20c opposite the active insert side surface 20a, whereas a back wall 48 of the insert receiving pocket supports the insert side surface 20b adjacent the active insert side surface 20a. The end face 16" of the second end portion 12" of the cutting insert is supported by a top wall 50 of the insert receiving pocket.

Figure 7:
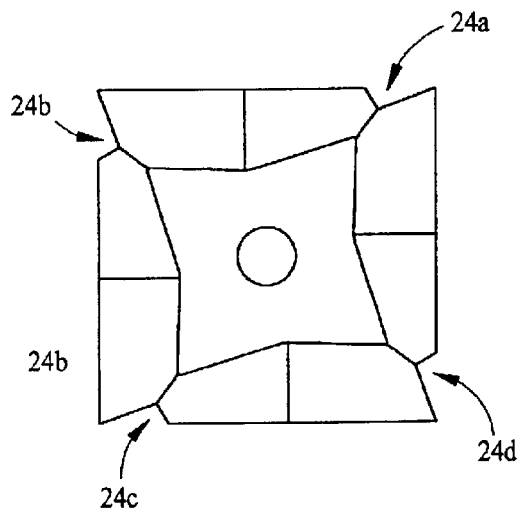
FIG. 7 is an end view of a cutting insert in accordance with the present invention with chip control elements having non-symmetric V-shaped profiles.
Figure 8:
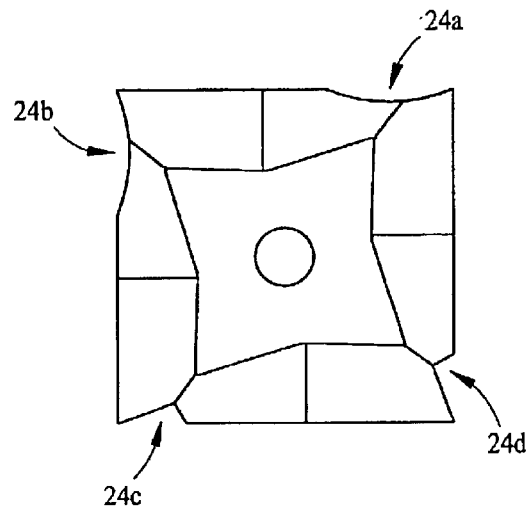
FIG. 8 is an end view of a cutting insert in accordance with the present invention with two different types of chip control elements.
Figure 9:
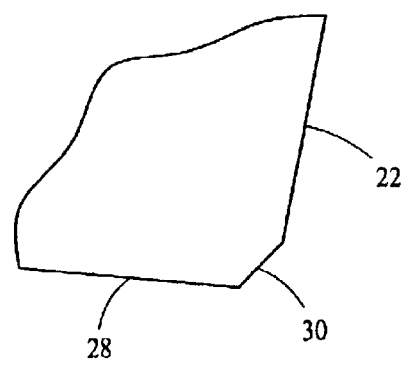
FIG. 9 is an illustrative view of a chamfered cutting edge.
Figure 10:
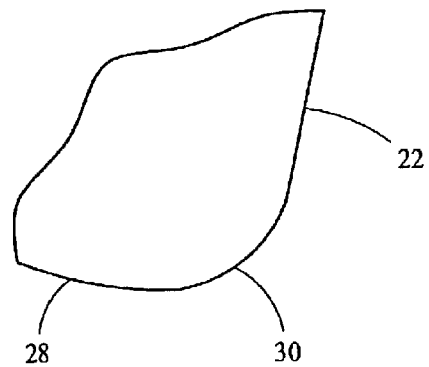
FIG. 10 is an illustrative view of a curved secondary cutting edge.

Although the present invention has been described to a certain degree of particularity, it should be understood that various alterations and modifications can be made without departing from the spirit or scope of the invention as hereinafter claimed. For example, FIG. 7 shows a cutting insert with a chip control element 24 which has a non-symmetric V-shape profile. FIG. 8 shows a cutting insert with two chip control elements (24a, 24b) with one kind of profile and the other two chip control elements (24c, 24d) with another kind of profile. Similarly, all four chip control elements can have different profiles. FIG. 9 shows a cutting insert with a chamfered cutting corner 30. Whereas, FIG. 10 shows a cutting insert with a curved secondary cutting edge 28, and a curved cutting corner 30.

What is claimed is:

1. A cutting insert comprising:
   two end portions and an intermediate portion extending therebetween, the cutting insert having an insert axis (A) which traverses the cutting insert in a first longitudinal direction between the two end portions;
   a number of side surfaces equal to an integer number N and N primary cutting edges, the N primary cutting edges being formed at the intersection of adjacent side surfaces, each one of the N primary cutting edges extending between the two end portions;
   at least N secondary cutting edges formed on at least one of the two end portions, the at least one of the two end portions extending along said first longitudinal direction;
   at least N cutting corners, each cutting corner being formed between a primary cutting edge and a secondary cutting edge, each secondary cutting edge extending away from an associated cutting corner in a direction generally away from the intermediate portion and along said first longitudinal direction.

2. A cutting insert having a longitudinal insert axis (A), an intermediate portion and two end portions connected to opposite ends of the intermediate portion, the in intermediate portion and the end portions extending along the longitudinal insert axis (A), a number of side surfaces equal to an integer number N, N primary cutting edges formed at the intersection of adjacent side surfaces and extending between the end portions, at least N secondary cutting edges formed on a first end portion, each of the N secondary cutting edges being connected to an associated primary cutting edge via a cutting corner, wherein:
   the first end portion has an axially outermost surface that is axially spaced apart from the intermediate portion along the longitudinal insert axis (A); and
   in a top view of the cutting insert, at least one of the N secondary cutting edges extends from an associated cutting corner in a direction of said axially outermost surface.

3. The cutting insert according to claim 2, wherein each primary cutting edge is provided with a chip control element.

4. The cutting insert according to claim 3, wherein the chip control element is a groove.

5. The cutting insert according to claim 4, wherein the groove has a U-shaped profile.

6. The cutting insert according to claim 4, wherein the groove has a non-symmetric V-shaped profile.

7. The cutting insert according to claim 2, wherein at least one end portion comprises a peripheral end surface extending from the N side surfaces to an end face.

8. The cutting insert according to claim 7, wherein the end face is provided with a recess.

9. The cutting insert according to claim 7, wherein the peripheral end surface extends from the N side surfaces generally longitudinally away from the intermediate portion and towards the insert axis (A).

10. The cutting insert according to claim 7, wherein the peripheral end surface comprises N sub-peripheral end surfaces.

11. The cutting insert according to claim 10, wherein each sub-peripheral end surface is divided into two portions, a leading portion and a trailing portion.

12. The cutting insert according to claim 11, wherein the leading portion of a sub-peripheral end surface and an adjacent chip control element meet at a secondary cutting edge.

13. The cutting insert according to claim 2, wherein at least one of the N cutting corners is chamfered.

14. The cutting insert according to claim 2, wherein at least one of the N secondary cutting edges is curved.

15. The cutting insert according to claim 2, wherein the cutting insert N-fold rotational symmetry about the insert axis (A).

16. The cutting insert according to claim 2, wherein N is at least four.

17. The cutting insert according to claim 2, wherein N is equal to 4.

18. The cutting insert according to claim 2, wherein the primary cutting edges are substantially straight and are substantially parallel to the insert axis (A).

19. A cutting insert having a longitudinal insert axis (A) and comprising:
   an intermediate portion and two end portions connected to opposite ends of the intermediate portion, the intermediate portion and the end portions extending along the longitudinal axis (A);
   a number of side surfaces equal to an integer number N and N primary cutting edges formed at the intersection of adjacent side surfaces, each one of the N primary cutting edges extending between the two end portions;
   at least N secondary cutting edges formed on a first end portion, said first end portion having an axially outermost surface that is axially spaced apart from the intermediate portion along the to longitudinal insert axis (A);
   at least N cutting corners, each cutting corner being formed between a primary cutting edge and a secondary cutting edge, wherein, in a top view of the cutting insert, the secondary cutting edge from an associated cutting corner in a direction of said axially outermost surface.

* * * * *